United States Patent

Kyle

[11] Patent Number: 5,603,660
[45] Date of Patent: Feb. 18, 1997

[54] VISCOUS DAMPER AND SHEAR PLATE FOR IMPROVED FLUID FLOW

[75] Inventor: Robert J. Kyle, Battle Creek, Mich.

[73] Assignee: Eaton Corporation, Cleveland, Ohio

[21] Appl. No.: 456,883

[22] Filed: May 31, 1995

[51] Int. Cl.⁶ .................................. F16D 3/80; F16D 3/66
[52] U.S. Cl. ................. 464/68; 192/55.4; 192/58.4; 192/208; 464/24
[58] Field of Search ............................ 192/208, 55.4, 192/58.7, 58.4; 464/24, 68

[56] References Cited

U.S. PATENT DOCUMENTS

| | | | |
|---|---|---|---|
| 3,002,595 | 10/1961 | Weir . | |
| 3,262,527 | 7/1966 | Attaben . | |
| 3,390,748 | 7/1968 | Hein et al. . | |
| 3,559,786 | 2/1971 | Long . | |
| 3,575,269 | 4/1971 | Sherman . | |
| 4,007,819 | 2/1977 | Maci | 192/58.7 X |
| 4,040,271 | 8/1977 | Rolt et al. . | |
| 4,227,861 | 10/1980 | LaFlame | 192/58.4 X |
| 4,235,322 | 11/1980 | Sutaruk | 192/58.7 X |
| 4,703,840 | 11/1987 | Bopp . | |
| 4,924,984 | 5/1990 | Kennedy | 192/58.7 |
| 4,932,509 | 6/1990 | Binder . | |
| 4,936,434 | 6/1990 | Clancey . | |
| 5,111,923 | 5/1992 | Kennedy | 192/58.7 |

Primary Examiner—Rodney H. Bonck
Attorney, Agent, or Firm—L. J. Kasper

[57] ABSTRACT

A torsion damping mechanism is disclosed of the type including a viscous damper in which a first sidewall defines a ramp surface. The clutch assembly includes a radially outer portion and a radially inner portion, the portions cooperating to define a plurality of windows or openings. The windows are located axially adjacent the ramp surface such that at least a portion of the fluid in the larger, first reservoir, under the influence of centrifugal force, flows radially outward, impinges the ramp surface, and is then deflected through one of the windows and into the opposite shear chamber. With the present invention, the amount of fluid flowing into the two shear chambers may be equalized, even though the reservoirs contain substantially different volumes of fluid. Thus, the shear chambers are filled faster, and the damper operates more smoothly.

5 Claims, 3 Drawing Sheets

5,603,660

VISCOUS DAMPER AND SHEAR PLATE FOR IMPROVED FLUID FLOW

BACKGROUND OF THE DISCLOSURE

The present invention relates to torsional vibration damping mechanisms, and more particularly, to such mechanisms of the type including viscous shear dampers.

Torsional vibration damping mechanisms have long been used to reduce the adverse effects of torsional vibrations or torque fluctuations in vehicle drive lines. Torsional vibrations, or torque fluctuations, hereinafter referred to as "torsionals", emanate primarily from the engine in the form of torque spikes, and occur primarily where there are abrupt changes in driveline torque, for example, upon rapid acceleration/deceleration or upon transmission ratio changes.

Most known prior art torsional vibration damping mechanisms have utilized springs, disposed in parallel with a mechanical friction device. Driveline torque is normally transmitted by the springs, and flexing of the springs attenuates or reduces the potential amplitude of the driveline torsionals. The mechanical friction device dampens or reduces the rate of spring recoil.

More recently, it has become known to utilize springs disposed in parallel with a viscous shear damper, in place of the mechanical friction device, to dampen the rate of spring recoil. Such a device is illustrated and described in U.S. Pat. No. 4,936,434, assigned to the assignee of the present invention and incorporated herein by reference.

In the device of the above-incorporated patent, the viscous shear damper includes a housing assembly comprising a pair of stamped sidewall members which define a fluid chamber, and a clutch member, which is typically also a stamped member. Each side of the clutch member cooperates with an adjacent sidewall member to define a viscous shear space.

A typical viscous shear damper of the type to which the present invention relates includes a radially inner reservoir portion, which also serves as an expansion chamber, to permit fluid to expand as the temperature increases during operation. Typically, the ID (inside diameter) of the reservoir is defined by a seal member which is fixed to the clutch member, and extends axially to engage each of the adjacent sidewall members.

It has been observed that when prior art torsion damping mechanisms are shut down after operation, some of the fluid flows into the reservoir of the viscous damper, thus creating voids in the damping cavity (i.e., between the clutch member and the adjacent sidewall surfaces). When the vehicle is operated again, the viscous fluid flows slowly, and more of the fluid tends to flow toward one side of the clutch member than the other. Such uneven flow of the viscous fluid can cause the clutch member to shift within the housing (i.e., closer to one sidewall member and further away from the other), which would cause the mechanism to lose some of its damping ability. The uneven flow of viscous fluid also has the effect of causing the filling of the viscous shear chamber to take even longer than it would normally take. Finally, the uneven filling of the viscous shear space can also cause an out-of-balance condition, which may be felt by the vehicle operator as roughness in the driveline, and which is especially undesirable in view of the fact that the whole purpose of the torsion damping mechanism is to remove roughness and torsionals.

The problem described above with the prior art torsion damping mechanism is especially likely to occur in those mechanisms in which the two reservoir portions (i.e., the portions of the reservoir forward and rearward of the clutch member) are of different volumes. The reservoirs being of different volumes is quite typical because of the limited space available, axially, adjacent the flywheel. In other words, the uneven flow of viscous fluid described above is even more likely to occur if there are different volumes of fluid in the forward and rearward portions of the reservoir.

SUMMARY OF THE INVENTION

Accordingly, it is an object of the present invention to provide an improved torsion damping mechanism, of the type including a viscous shear damper, wherein the viscous fluid flows to both sides of the clutch member in substantially equal amounts, even if the reservoirs are of unequal volumes.

It is another object of the present invention to provide such an improved torsion damping mechanism which achieves the above-stated object and, in addition, causes the fluid to flow more rapidly and achieve filling of the entire damping chamber more quickly.

The above and other objects of the invention are accomplished by the provision of a torsion damping mechanism adapted for connection between input and output drives of a torque transmitting drive line. The mechanism comprises resilient means for drivingly interconnecting the drives, and a viscous damper including annular housing and clutch assemblies adapted for rotation about a rotational axis of one of the drives. The housing assembly includes first and second radially extending sidewalls having mutually facing first and second sidewall surfaces, respectively, defining an annular radially extending compartment having an open, radially inner extent and a radially outer extent. The housing assembly is adapted to be driven by one of the drives. The clutch assembly includes a radially outer portion and a radially inner portion adapted for driving connection to the other of the drives. The radially outer portion has oppositely facing, radially extending first and second surfaces disposed in close, axially spaced relation to the first and second sidewall surfaces, respectively, to define first and second viscous shear chambers, respectively. Dynamic seal means cooperate with the clutch inner portion and the first and second sidewalls. The radially inner portion of the clutch assembly cooperates with the first sidewall and the seal means to define a first reservoir portion, and with the second sidewall and the seal means to define a second reservoir portion. The first reservoir portion has a greater fluid volume than the second reservoir portion. The first sidewall includes a ramp surface disposed adjacent a radially outer portion of the first reservoir portion.

The improved torsion damping mechanism is characterized by the radially outer portion and the radially inner portion of the clutch assembly cooperating to define a plurality of circumferentially-extending openings disposed generally axially adjacent the annular ramp surface. At least a portion of the fluid in the first reservoir portion, under the influence of centrifugal force, flows radially outward, impinges the ramp surface, and is deflected from the ramp surface and flows through one of the circumferentially-extending openings and into the second shear chamber.

DESCRIPTION OF THE PREFERRED EMBODIMENT

Figure 1:
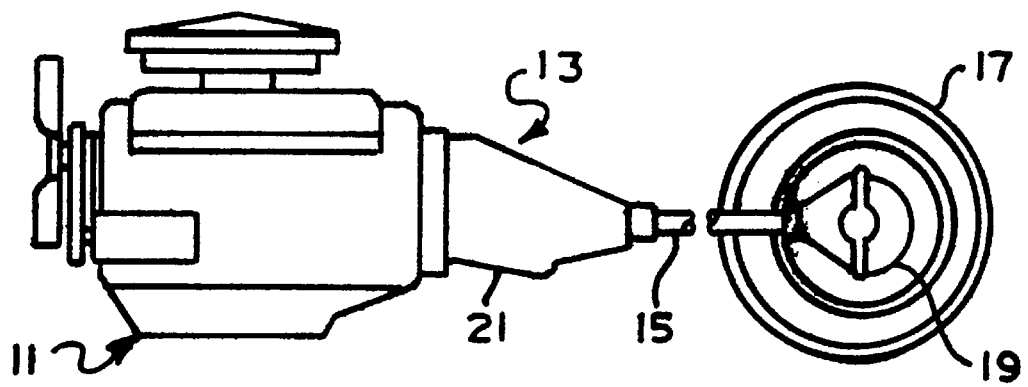
FIG. 1 is a schematic view of a motor vehicle driveline.

Referring now to the drawings, which are not intended to limit the invention, FIG. 1 illustrates a motor vehicle driveline, including a prime mover 11 and a transmission 13 having an output shaft 15. The output shaft 15 is typically drivingly connected to a load, such as a ground engaging wheel 17 by means of a differential gear assembly 19, illustrated herein, by way of example only, as comprising part of a rear axle of a vehicle. The prime mover 11 is preferably of the internal, periodic combustion type, but may be any type of power plant having torque characteristics that are improved by means of the use of a torsional vibration damping mechanism. The transmission 13 includes a housing 21 containing a plurality of constant mesh ratio gears (not shown herein) for ratio change mechanisms driven by a transmission input shaft 23, shown only in FIG. 2. Well known ratio change devices or clutches within the transmission 13 are employed to selectively (i.e., either manually or automatically), place the transmission in a neutral position, wherein the input shaft 23 is not connected to the load, or place the transmission in an in-gear position, wherein the input shaft 23 is connected to the load.

Figure 3:
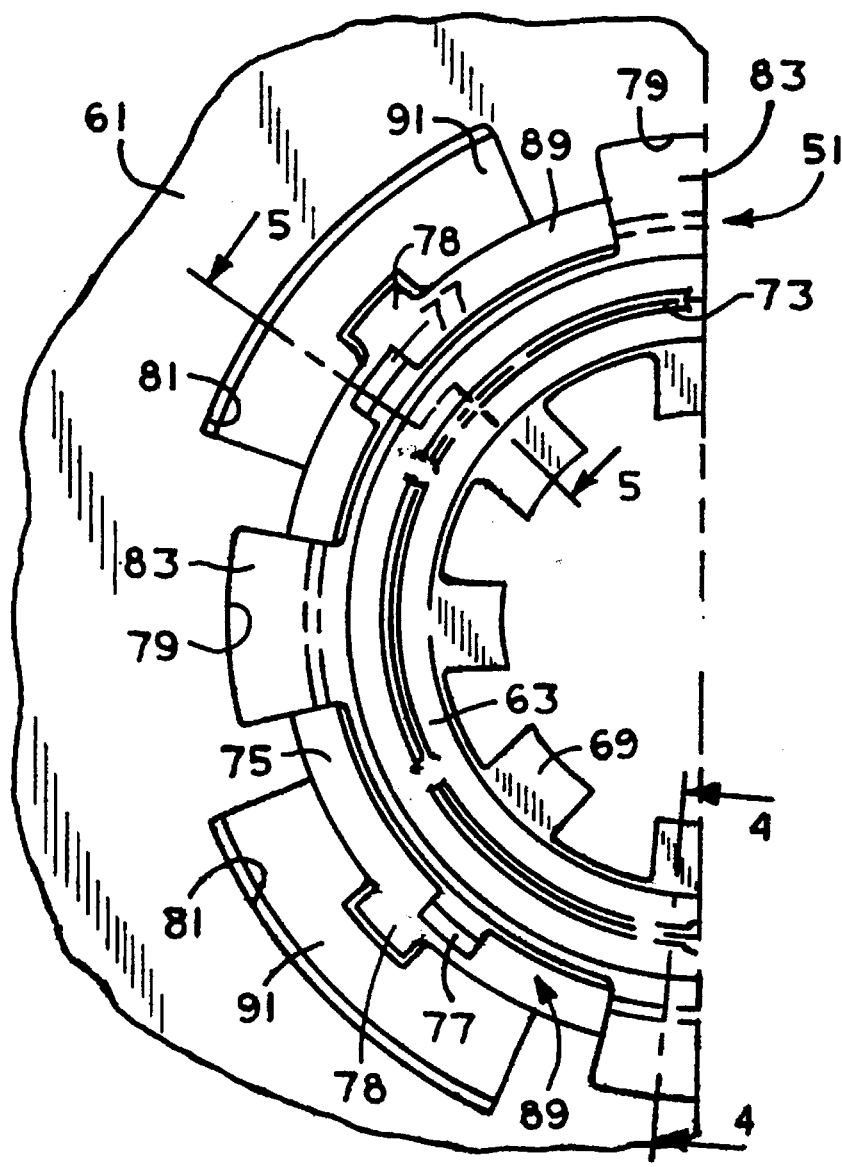
FIG. 3 is one-half of a fragmentary, sectional view of the viscous damper of the present invention, taken on line 3—3 of FIG. 2.
Figure 2:
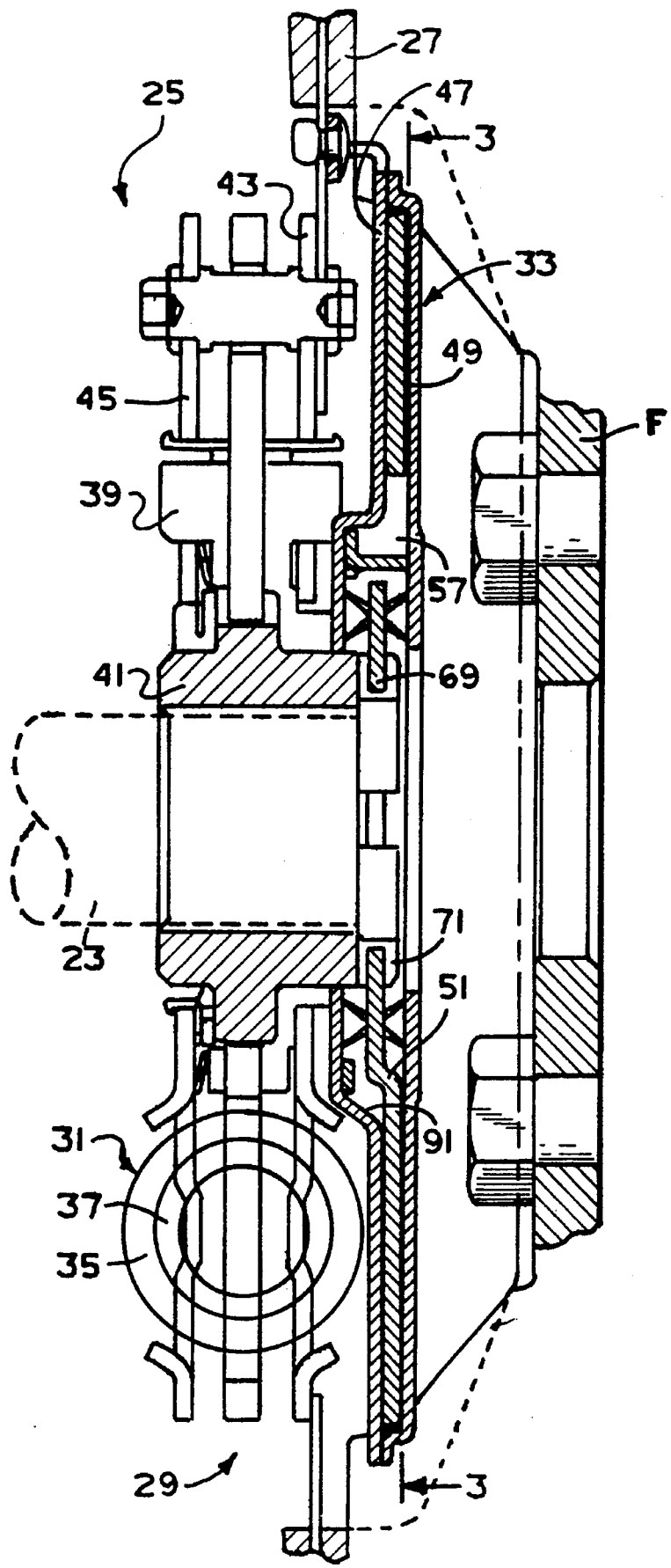
FIG. 2 is an axial cross-section of a torsion damping mechanism made in accordance with the present invention.

Referring now to FIGS. 2 and 3, there is illustrated an annular clutch plate assembly 25, disposed for rotation about the axis of the transmission input shaft 23. The clutch plate assembly 25 includes a fragmentarily shown annular friction ring 27 in driving relation with the input shaft 23 by means of a torsion damping mechanism 29, disposed radially between the friction ring 27 and the input shaft 23. In view of the above-incorporation of U.S. Pat. No. 4,936,434, the clutch plate assembly 25 will be described only briefly herein.

The friction ring 27 is typically frictionally connectable to an engine flywheel F, shown only fragmentarily in FIG. 2. The friction ring 27 is conventionally moved into frictional engagement with the flywheel F in response to selective axial movement of a pressure plate (not shown herein) in a manner well known to those skilled in the art.

The torsion damping mechanism, generally designated 29, includes a spring damper portion, generally designated 31, which is well known in the art, and a viscous shear damper portion, generally designated 33.

The spring damper portion 31 includes a set of pairs of springs 35,37 for transmitting full driveline torque, an intermediate member 39, a hub 41 slidably splined to the input shaft 23, and a support structure including annular side plates 43,45

The viscous shear damper 33 includes an annular housing comprising first and second radially extending sidewalls 47,49 and a clutch assembly generally designated 51, which will be described in greater detail subsequently. The first and second sidewalls 47 and 49 have first and second mutually facing sidewall surfaces 53,55, respectively. With the sidewalls 47 and 49 assembled, the sidewall surfaces 53 and 55 cooperate to define an annular radially extending compartment having an open, radially inner extent 57 (shown only in FIG. 2), and a radially outer extent 59 (shown in FIG. 5).

Figure 4:
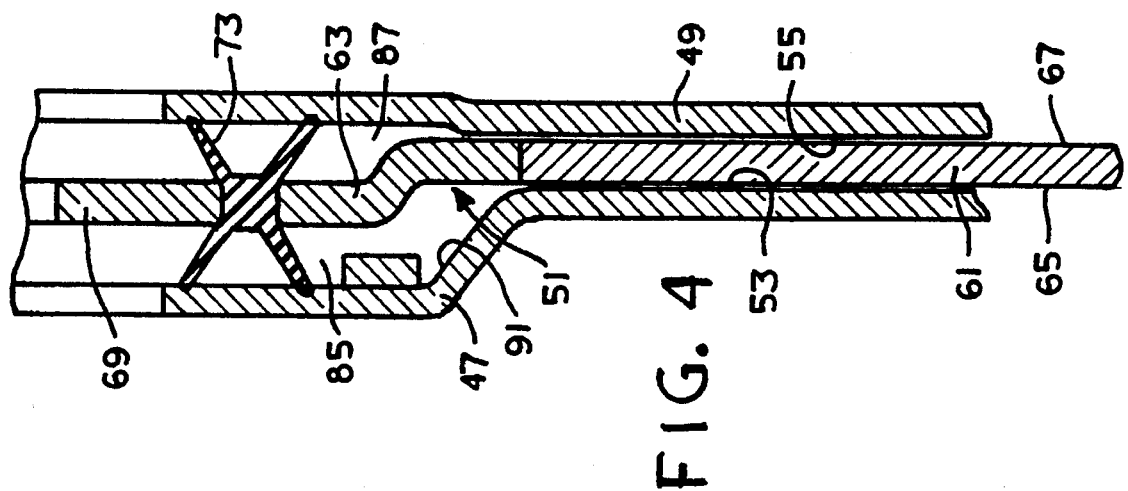
FIG. 4 is an enlarged, fragmentary axial cross-section taken on line 4—4 of FIG. 3, illustrating a "non-window" portion of the damper.
Figure 5:
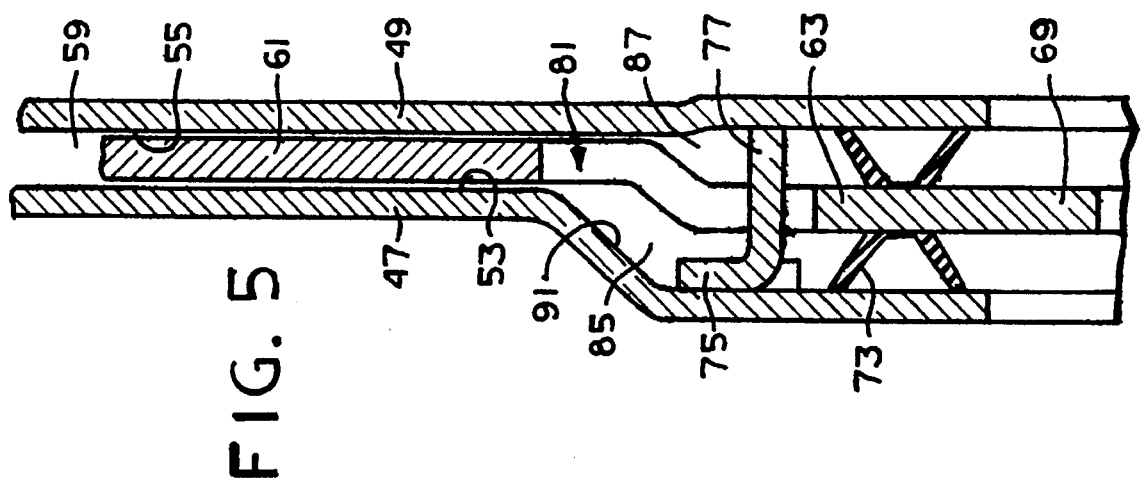
FIG. 5 is an enlarged, fragmentary axial cross-section, taken on line 5—5 of FIG. 3, illustrating a "window" portion of the damper.

Referring now to FIGS. 3–5, the clutch assembly 51 includes a radially outer shear plate 61 and a radially inner shear plate 63. As is best shown in FIG. 4, the outer shear plate 61 has oppositely facing first and second surfaces 65 and 67, respectively which are disposed in closely spaced relation to the first and second sidewall surfaces 53 and 55, respectively. The first surfaces 53 and 65 cooperate to define a first viscous shear chamber, being referred to hereinafter by the reference numerals "53,65", and the second surfaces 55 and 67 cooperate to define a second viscous shear chamber, being referred to hereinafter by the reference numerals "55,67".

The inner shear plate 63 includes a plurality of tabs 69 which are in driving engagement with a mating set of splines or teeth 71 (shown only in FIG. 2), or other suitable interconnection means. The inner shear plate 63 also includes a dynamic seal member 73, including a plurality of sealing legs or portions preferably disposed against the radially inner, facing surfaces of the sidewalls 47 and 49. Preferably, the seal member 73 is molded integrally with the shear plate 63, in accordance with the teachings of U.S. Pat. No. 4,936,433, assigned to the assignee of the present invention and incorporated herein by reference. As may best be seen in FIGS. 3 and 5, disposed between the sidewalls 47 and 49 is a spacer assembly 75 including a plurality of axially-extending tabs 77, the function of which is to maintain a predetermined axial separation between the sidewalls 47 and 49. The spacer assembly 75 also includes a plurality of non-rotation tabs 78 (shown only in FIG. 3), and may be better understood by reference to U.S. Pat. No. 4,936,434, assigned to the assignee of the present invention and incorporated herein by reference. It should be understood however that the present invention is not limited to any particular configuration of spacer assembly, and at least theoretically, the present invention does not even require such a spacer assembly.

Referring now to FIG. 3, the outer shear plate 61 defines a plurality of openings 79, and alternating therewith circumferentially, a plurality of windows 81, the function of which will be described subsequently. The inner shear plate 63 defines a plurality of tabs 83, each of which is received within one of the openings 79. Preferably, both the outer shear plate 61 and the inner shear plate 63 may be stamped from a single piece of sheet metal. In this regard, it should be noted that the tabs 83 on the inner shear plate 63 have a smaller radius than that of the windows 81 defined by the outer shear plate 61. Therefore, and by way of example only, the shear plates may be stamped with the tabs 83 being disposed within the windows 81, but then upon assembly, the tabs 83 are disposed within the openings 79.

The engagement of the tabs 83 within the openings 79 provides for the transmission of torque from the input shaft 23 through the inner shear plate 63 to the outer shear plate 61, and then to the friction ring 27 in a manner well known to those skilled in the art. Although the tabs 83 are illustrated in FIG. 3 as being in "line-to-line" engagement with the sides of the openings 79, thus providing a zero backlash fit, those skilled in the art will understand that it may be desirable in certain vehicle applications to provide a clearance between the tabs 83 and the sides of the openings 79. Such clearances would provide a small amount of positive backlash, for example, permitting perhaps 2 degrees or 4 degrees of relative rotation between the inner shear plate 63 and the outer shear plate 61. It should be understood that, for purposes of the present invention, the presence of, or the amount of, backlash is irrelevant. Furthermore, it is also within the scope of the present invention for the shear plates 61 and 63 to be combined as a single integral member, although the use of a single, integral shear plate may complicate the process of molding the seal member 73 integral with the shear plate and thus, in the subject embodiment, the shear plates 61 and 63 are stamped separately.

Referring now primarily to FIG. 4, the clutch assembly 51 cooperates with the first sidewall 47 to define a first reservoir portion 85, and cooperates with the second sidewall 49 to define a second reservoir portion 87. As was mentioned in the BACKGROUND OF THE DISCLOSURE, the present invention is especially adapted for use in devices in which one of the reservoir portions is larger than the other, and it may be seen in FIGS. 4 and 5 that the first reservoir portion 85 has a substantially greater volume than the second reservoir portion 87.

As may best be seen in FIG. 5, one function of the windows 81 is to provide an opening for the tabs 77 to extend axially from one sidewall 47 to the other sidewall 49. Therefore, as is shown only in FIG. 3, the tabs 77 are disposed between the adjacent tabs 83, which define the ends, circumferentially, of a radially inner portion 89 of the window 81. As may be seen in FIG. 3, the inner portion 89 has a greater circumferential extent than the radially outer main portion of the window 81.

Referring now primarily to FIGS. 3 and 5, the primary function of the windows 81, for purposes of the present invention, will be described. Disposed axially adjacent each of the windows 81, the first sidewall 47 includes an angled portion, as opposed to the radially extending and axially extending portions (forming a right angle) shown in the upper half of FIG. 2. The angled portion of the first sidewall 47 defines an internal ramp surface 91. Preferably, each of the ramp surfaces 91 is centered circumferentially within its window 81, when the damping mechanism 29 is in a neutral or centered position, such that the ramp surface 91 will still be disposed within the window 81 as the clutch assembly 51 is displaced in either direction from its centered position. In the subject embodiment, instead of a plurality of ramp surfaces 91, the first sidewall 47 defines one continuous, annular ramp surface 91, interrupted somewhat only to the extent necessary to receive the non-rotation tabs 78.

The above-described "centered" relationship is appropriate for a damper which is intended to be displaceable from the neutral position by about the same amount in either direction. For example, the damper may be designed to have a displacement of plus and minus twenty degrees. However, the invention is not so limited, and if the damper is designed to have greater displacement in one direction than in the other, each ramp surface 91 may be offset circumferentially from the "center" of its respective window 81. In that case, the tabs 77 would also be offset circumferentially from a centered position between the tabs 83, when the clutch assembly 51 is in the neutral position relative to the sidewalls 47 and 49.

In accordance with a primary aspect of the present invention, the ramp surfaces 91, adjacent each of the windows 81, defines the radially outer extent of the larger of the two reservoir portions, i.e., in the subject embodiment, the first reservoir portion 85. Therefore, after a period of time during which the vehicle has not been in operation, most of the viscous fluid within the damper portion 33 will collect in the "lower" portion of the damper, i.e., below the seal member 73 in FIG. 4. When the vehicle is again operated, and the damping mechanism 29 begins to rotate, the fluid which is in the reservoir portions 85 and 87 in FIG. 4 will begin to flow circumferentially around each of the reservoir portions 85 and 87, respectively.

As was noted previously, the fluid volume of the first reservoir portion 85 is substantially greater than that of the second reservoir portion 87, but it is very important for the proper operation of the damper portion 43 to have the same amount of fluid in the first viscous shear chamber 53,65 as in the second viscous shear chamber 55,67. As the fluid within the first reservoir portion 85 begins to flow radially outward, under the influence of centrifugal force, a certain portion of that fluid impinges the ramp surfaces 91, the angle of which is selected such that the fluid impinging the surfaces 91 will then be deflected rearwardly (to the right in FIGS. 2 and 5) through the adjacent window 81 and into the second viscous shear chamber 55,67. It is believed to be within the ability of those skilled in the art to select the angle of the ramp surfaces 91 to achieve, and even to optimize, the object described above. In the subject embodiment, and by way of example only, the angle of the ramp surfaces 91 is approximately 45 degrees relative to the axis of rotation.

It is also believed to be within the ability of those skilled in the art, in view of the teachings of the present application, to select the appropriate size of the windows 81, and to locate the windows 81 relative to the ramp surfaces 91, to achieve the desired results. As was noted previously, it is the intention of the present invention to deflect a sufficient amount of viscous fluid from the larger, first reservoir portion 85 into the second viscous shear chamber 55,67 such that there will be equal amounts of fluid in the two shear chambers. Providing equal amounts of fluid into the two shear chambers will also prevent axial shifting of the outer shear plate 61 relative to the sidewalls 47 and Finally, it is an intention of the present invention to provide even flows to the first and second shear chambers such that total filling of the shear chambers will occur more rapidly. In the course of the development of the present invention, a prior art device was tested in which the damper portion did not include the windows 81 of the present invention. The device was filled with fluid having a viscosity of 300,000 Centistoke, and it was observed that after an extended period of non-use, it took approximately 20 minutes to achieve complete filling of both the first and second viscous shear chambers. It has been observed that, in order to achieve complete filling of both viscous shear chambers, some of the fluid from the larger reservoir must flow around the OD of the shear plate 61, and flow radially inward, in opposition to centrifugal force.

Subsequently, the test was repeated in which the only change was the provision of the windows 81 and the ramp surfaces 91 as illustrated and described herein. The testing of the device made in accordance with the present invention revealed that it took less than 3 minutes to achieve complete filling of both the first and second viscous shear chambers. In other testing, simulating other fluid viscosities, the fill times were greater or lesser, depending upon whether the fluid viscosity was greater or less than 300,000 Centistoke, but the times, with and without the invention, were in approximately the same proportion as the 3 minutes and 20 minutes noted above.

In the subject embodiment, and by way of example only, there are four of the windows 81, each of which has a circumferential extent of about 45 degrees. Thus, the total circumferential extent of the four windows 81 is approximately 180 degrees. In another embodiment, if the reservoir 85 were even larger, relative to the reservoir 87, it would probably be desirable for the windows 81 to have a total circumferential extent of more than 180 degrees. In other words, the greater the disparity between the two reservoirs, the greater the total extent of the windows. As should be apparent from the preceding specification, it is within the scope of the present invention to change the number of windows 81, as well as the circumferential extent of each, and the total circumferential extent of all of the windows. However, it is still preferable to have one of the ramp surfaces 91 for each window 81, and it is also preferable for the ramp surface 91 to be centered circumferentially within its window 81, as was described previously.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A torsion damping mechanism adapted for connection between input and output drives of a torque transmitting driveline; said mechanism comprising resilient means for drivingly interconnecting the drives, and a viscous damper including annular housing and clutch assemblies adapted for rotation about a rotational axis of one of the drives; said housing assembly including first and second radially extending sidewalls having mutually facing first and second sidewall surfaces, respectively, defining an annular, radially extending compartment having an open, radially inner extent and a radially outer extent, said housing assembly adapted to be driven by one of the drives; said clutch assembly including a radially outer portion and a radially inner portion adapted for driving connection to the other of the drives, said radially outer portion having oppositely facing, radially extending first and second surfaces, disposed in close, axially spaced relation to said first and second sidewall surfaces, respectively, to define first and second viscous shear chambers, respectively, dynamic seal means cooperating between said clutch inner portion and said first and second sidewalls; said radially inner portion of said clutch assembly cooperating: (i) with said first sidewall and said seal means to define a first reservoir portion; and (ii) with said second sidewall and said seal means to define a second reservoir portion, said first reservoir portion having a greater fluid volume than said second reservoir portion; said first sidewall including a ramp surface disposed adjacent a radially outer portion of said first reservoir portion; characterized by:

(a) said radially outer portion and said radially inner portion of said clutch assembly cooperating to define a plurality N of circumferentially-extending openings disposed generally axially adjacent said annular ramp surface each of said openings extending radially outwardly beyond said ramp surface; whereby (b) at least a portion of the fluid in said first reservoir portion, under the influence of centrifugal force, flows radially outward, impinges said ramp surface, and is deflected from said ramp surface and flows through one of said circumferentially-extending openings and into said second viscous shear chamber.

2. A torsion damping mechanism as claimed in claim 1, characterized by the total circumferential extent of said plurality N of circumferentially-extending openings is approximately 180 degrees.

3. A torsion damping mechanism as claimed in claim 2, characterized by each of said plurality N of circumferentially-extending openings has a circumferential extent of about 45 degrees, and N is equal to four.

4. A torsion damping mechanism as claimed in claim 1, characterized by said radially outer portion of said clutch assembly comprises one member and said radially inner portion of said clutch assembly comprises a separate member, said dynamic seal means being formed integrally with said radially inner portion.

5. A torsion damping mechanism as claimed in claim 1, characterized by said plurality N of circumferentially-extending openings being sized, and located relative to said ramp surface whereby the amount of fluid which flows to said first viscous shear chamber is approximately equal to the amount of fluid which flows to said second viscous shear chamber.

* * * * *